United States Patent [19]
McKillip

[11] Patent Number: 5,462,488
[45] Date of Patent: Oct. 31, 1995

[54] INTEGRATED CARD AND BUSINESS FORM ASSEMBLY AND METHOD FOR FABRICATING SAME ON LABEL FORMATION EQUIPMENT

[75] Inventor: John J. McKillip, Chicago, Ill.

[73] Assignee: Stanley Stack, Jr., Barrington, Ill.; a part interest

[21] Appl. No.: 239,240

[22] Filed: May 6, 1994

[51] Int. Cl.⁶ ........................................ B42D 15/00
[52] U.S. Cl. ........................ 462/26; 283/62; 283/67; 283/101
[58] Field of Search ................. 281/2, 5; 462/2, 462/8, 26, 84, 900; 283/67, 62, 100, 101; 156/250

[56] References Cited

U.S. PATENT DOCUMENTS

| | | | |
|---|---|---|---|
| 4,865,669 | 9/1989 | Schmidt | 462/26 X |
| 5,183,436 | 2/1993 | Shaley | 462/26 X |
| 5,219,183 | 6/1993 | McKillip | 283/62 |
| 5,267,898 | 12/1993 | Doll et al. | 462/26 X |
| 5,362,106 | 11/1994 | Longtin | 283/62 X |

*Primary Examiner*—Willmon Fridie
*Attorney, Agent, or Firm*—Dick and Harris

[57] ABSTRACT

An integrated card and business form assembly and method for fabricating same on a label formation equipment, or the like. The assembly comprises a first layer of material and a second layer of material adhesively attached to each other. The second layer of material has at least one card member and a surrounding border region, wherein the top and bottom surfaces of the at least one card member are substantially co-planar with the top and bottom surfaces, respectively, of the surrounding border region. The at least one card member is detachable from the first layer of material without any substantial migration of adhesive to the bottom surface of the at least one card member—so as to substantially preclude tackiness to the bottom surface of the at least one card member.

22 Claims, 4 Drawing Sheets

INTEGRATED CARD AND BUSINESS FORM ASSEMBLY AND METHOD FOR FABRICATING SAME ON LABEL FORMATION EQUIPMENT

BACKGROUND OF THE INVENTION

The present invention relates in general to identification cards and business forms, and, in particular, to an integrated card and business form assembly, and method of fabrication of same, on a label formation equipment/machines, or the like.

Identification cards, such as insurance identification cards, which are attached to business forms, have been known in the art for several years. Typically, such cards and business forms are each fabricated on independently located press operations and then united, or attached, to each other, at a third press. However, regardless of the number of presses used during such fabrication, the end product itself has resulted in various deficiencies.

Indeed, the identification cards are typically printed and cut from a roll of card stock, and then, the cut cards are applied to business forms via a "tipping operation"—wherein adhesive and the identification cards are sequentially applied to predetermined regions of the business forms. Inasmuch as such a procedure requires the application of adhesive to such predetermined regions on the business forms, followed by mechanical placement of the cards to such predetermined regions, it is not uncommon for 1) adhesive to extend beyond the periphery of the attached cards—thereby causing, among other things, business forms to stick together upon stacking; and 2) a lack of uniformity relative to the physical positioning of the cards on the respective business forms.

After the identification cards have been tipped onto the respective business forms, the combined cards and business forms are generally sent to an end user for further "client specific" indicia to be applied directly onto the identification cards, and in some instances, to the business forms as well. For example, if the identification cards are to be used as "insurance cards" (e.g., for State Farm, Allstate, etc.) the insurance companies will need to apply additional indicia (e.g., name of person insured, type of coverage, coverage period) to the identification cards and/or business forms. Accordingly, such indicia is typically applied via a high speed laser printer—such as a Siemens 2140 or 2200 printer—wherein such a printer employs a drum/roller and a floating laser head.

As the combined cards and business forms are fed into the printer, the face of the cards actually come into contact with the surface of the drum. Over time, the edge of the identification cards, which are generally in a non-planar relationship with the adjacent surface of the associated business forms, eventually wearing damaging grooves into the surface of the drum—thereby requiring premature replacement of the drum. Furthermore, as the identification cards pass over the drum, it is not uncommon for the edge/radius of the card to partially lift off of the corresponding business form, and, in turn, potentially catch on a component within the printer—thereby resulting in a jam, or even damage to the printing apparatus itself. Additionally, inasmuch as the top surface of the identification cards are at substantially different depths, relative to the top surface of the business form they are attached, the laser head applying such additional indicia is not always capable of adjusting to such differences at a speed fast enough to keep up with product movement through the high speed printer. Accordingly, printing flaws are not uncommon.

It is thus an object of the present invention to provide an integrated card and business form assembly fabricated on label formation machines which produces a product having uniformly aligned identification cards on the business forms.

It is also an object of the present invention to provide an integrated card and business form assembly fabricated on label formation machines which substantially reduces the risk of the edge of the identification card causing damage and/or loss in production time to additional apparata (such as a high speed printer) which may be used for applying further identifying indicia thereon.

It is also an object of the present invention to provide an integrated card and business form assembly fabricated on label formation machines wherein such fabrication can all be done on a single press to, in turn, avoid the need for separately located operations and, in turn to enable a substantial increase in production of such integrated cards and business forms.

These and other objects of the present invention will become apparent in light of the present Specification, claims and Drawings.

SUMMARY OF THE INVENTION

The present invention comprises an integrated card and business form assembly capable of being fabricated on label formation equipment/machines, such as a label converting press, or the like. The assembly comprising a first layer of material having an upper surface and a lower surface opposite the upper surface. A second layer of material comprises at least one card member together with a surrounding border region. The second layer of material has a top surface and a bottom surface. Accordingly, the at least one card member and the surrounding border region each have a top and bottom surface—wherein the top and bottom surfaces of the at least one card member are substantially co-planar with the top and bottom surfaces, respectfully, of the surrounding border region.

Adhesive means are operably applied to at least a portion of at least the upper surface of the first layer of material for releasably securing the at least one card member thereto. Preferably such adhesive will comprise a pressure sensitive adhesive such as an acrylic based permanent adhesive or a removable rubber based adhesive—although other conventional adhesives are also contemplated.

The at least one card member includes means for releasable detachment from the upper surface of the first layer of material, and from the surrounding border region, without any substantial portions of the adhesive means migrating from the top surface of the first layer of material to the bottom surface of the at least one card member—thereby substantially precluding the bottom surface of the at least one card member from bearing tackiness.

In a preferred embodiment of the invention, the means for releasable detachment of the at least one card member comprises laminate means operably applied to the bottom surface of the at least one card member of the second layer of material for increasing the rigidity of each of the at least one card member as well as for reducing adhesion of the bottom surface of the at least one card member to the upper surface of the first layer of material through the adhesive means. In addition, the laminate means further serves to facilitate removal of the at least one card member from the upper surface of the first layer of material without any substantial migration of the adhesive means.

The second layer of material may comprise a single sheet of material. At least a portion of this single sheet of material has at least one multi-directional score line, wherein the score line substantially defines the entire periphery of the at least one card member for frangible detachment of the at least one card member from the surrounding border region. In addition, each of the first and second layers of material include substantially aligned corresponding first and second side edges respectively, and a plurality of holes operably positioned adjacent each of the corresponding first and second side edges. These plurality of holes extend through the first and second layers of material for eventual cooperation, if need be, with a tractor feed mechanism typically used in association with printing apparatus.

In a preferred embodiment, the integrated card and business form assembly further comprises perforation means operably formed across the first and second layers of material at designated intervals for enabling individual portions of the attached first and second layers of material to be separated from remaining portions of the attached first and second layers of material so as to form individual ones of the integrated card and business form assemblies.

The integrated card and business form assembly further comprises indicia operably applied onto at least one of the top and bottom surfaces of the second layer of material. It is also contemplated that indicia be applied to at least one of the top and bottom surfaces of the first layer of material as well.

The invention further comprises a method of manufacturing an integrated card and business form on one or more conventional label formation machines. The method comprises the steps of a) feeding a first layer of material into the one or more label formation machines, wherein the first layer of material has an upper surface and a lower surface opposite the upper surface; b) introducing a second layer of material into the one or more label formation machines, wherein the second layer of material has a top surface and a bottom surface opposite the top surface; c) applying adhesive to the upper surface of the first layer of material; d) releasably attaching the upper surface of the first layer of material to at least a portion of the bottom surface of the second layer of material through the adhesive so applied; and e) cutting a continuous peripheral portion of the second layer of material through its entire depth without cutting through the entire depth of the first layer of material. The cutting through the entire depth of the continuous peripheral portion of the second layer of material creating at least one detachable card member having a top surface and a bottom surface opposite the top surface, and a surrounding border region having a top surface and a bottom surface opposite the top surface, operably located about the at least one card member. The top surface of the at least one card member is substantially co-planar with the top surface of the surrounding border region and the bottom surface of the at least one card member is substantially co-planar with the bottom surface of the surrounding border region. Each of the at least one card members are releasably detachable from the upper surface of the first layer of material without any substantial portions of the adhesive migrating from the top surface of the first layer of material to the bottom surface of the at least one card member—thereby substantially precluding the bottom surface of the at least one card member from bearing any tackiness.

In a preferred embodiment of the invention, the method further includes the step of printing indicia on at least a portion of at least one of the top and bottom surfaces of the second layer of material after introduction of the second layer of material into the one or more label converting presses. It is also contemplated that the method include the step of printing predetermined indicia onto either or both of the at least one card member and/or the surrounding boarder region, as well as on the upper and/or lower surfaces of the first layer of material.

In this preferred embodiment of the invention, the method of manufacturing an integrated card and business form on one or more label converting presses further includes the step of applying an adhesive deadner to at least a portion of the bottom surface of the second layer of material. The adhesive deadner serves to preclude adhesion of adjacently positioned portions of the top surface of the first layer of material to the bottom surface of the second layer of material. The method includes the step of cutting and removing the adjacently positioned portions of the top surface of the first layer of material which have been substantially precluded from adhesion to the bottom surface of the second layer of material by the adhesive deadner.

In another preferred embodiment of the invention, the method of manufacturing an integrated card and business form on one or more label formation machines further includes the step of applying a laminate material to at least one of the top and bottom surfaces of the second layer of material. In one preferred embodiment, the laminate is applied to the top surface of the first layer of material. In this embodiment, the method further includes the step of applying an adhesive deadner to at least a portion of the bottom surface of the second layer of material prior to applying the laminate material. The adhesive deadner thereby serves to preclude adhesion of adjacently positioned portions of the laminate material and, in turn, adjacently positioned portions of the top surface of the first layer of material, to the bottom surface of the second layer of material.

In a preferred embodiment of the invention, the method of manufacturing an integrated card and business form on one or more label formation machines further includes the step of perforating across a portion of the first and second layers of material after the step of attaching the first and second layers of material to each other so as to facilitate future separation of predetermined portions of the attached first and second layers of material from one another. This method also contemplates the step of punching holes adjacent the first and second side edges of the attached first and second layers of material so as to facilitate use of the integrated card and business form created thereby on conventional business equipment which requires such holes for transmission via tractor feed mechanisms.

In another preferred embodiment, the step of applying adhesive to at least a portion of the upper surface of the first layer of material comprises applying adhesive only to that portion of the upper surface which will become adjacently positioned to each of the at least one detachable card members. In this preferred embodiment, the method further comprises the step of removing the cut surrounding border region away from the at least one detachable card member and, in turn, away from the first layer of material.

In a preferred embodiment of the invention, the method of manufacturing an integrated card and business form on one or more label formation machines comprises the step of utilizing a single label formation machine, such as a single label converting press, for such manufacturing.

In yet another preferred embodiment, a method of manufacturing an integrated card and business form on one or more label formation machines comprises the steps of a) feeding a first layer of material into the one or more label formation machines, the first layer of material having an upper surface and a lower surface opposite the upper surface; b) introducing a second layer of material into the one or more label formation machines wherein the second layer of material has a top surface and a bottom surface opposite the top surface; c) applying adhesive to predetermined regions of the upper surface of the first layer of material; d) releasably attaching at least a portion of the upper surface of the first layer of material to at least a portion of the bottom surface of the second layer of material through the adhesive so applied; e) cutting a continuous peripheral portion of the second layer of material through its entire depth without cutting through the entire depth of the first layer of material. The cutting through the entire depth of the continuous peripheral portion of the second layer of material creating at least one detachable card member having a top surface and a bottom surface opposite the top surface, and a surrounding border region having a top surface and a bottom surface opposite the top surface, operably located about the at least one card member. The top surface of the at least one card member is substantially co-planar with the top surface of the surrounding border region and the bottom surface of the at least one card member is substantially co-planar with the bottom surface of the surrounding border region. Each of the at least one card members have their respective bottom surfaces positioned adjacent to, and, in turn, in contact with, a corresponding predetermined region of adhesive; f) removing the cut surrounding border region of the second layer of material away from the at least one detachable card member and, in turn, away from the first layer of material; and g) simultaneously depressing the at least one card member and adjacently positioned portions of the first layer of material so that the bottom surface of each of the at least one card member is operably positioned below the upper surface of contiguous positioned portions of the first layer of material.

Each of the at least one card members are releasably detachable from the predetermined and depressed regions of the first layer of material without any substantial portions of the adhesive migrating from the predetermined regions of the adhesive on the top surface of the first layer of material to the bottom surface of the at least one card member—thereby substantially precluding the bottom surface of the at least one card member from bearing any tackiness.

DETAILED DESCRIPTION OF THE DRAWINGS

Figure 1:
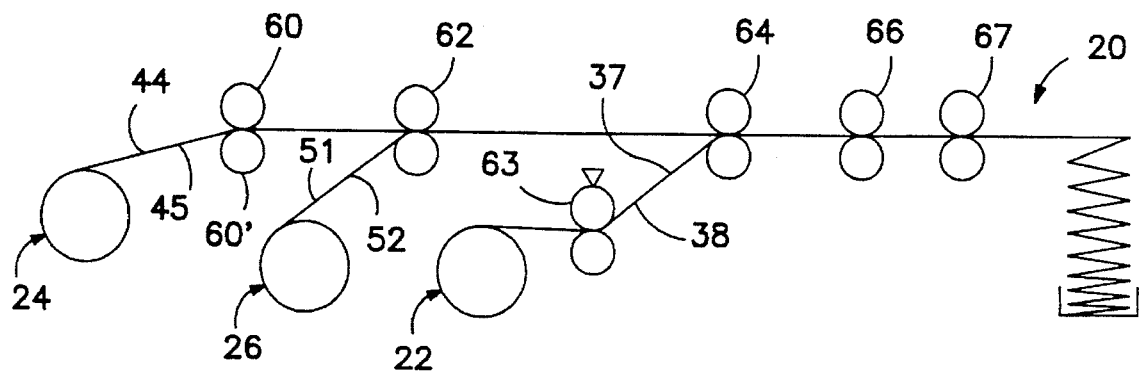
FIG. 1 of the drawings is a schematic diagram associated with the method of manufacturing the integrated card and business form showing, in particular, such manufacturing on a single operating press.

While this invention is susceptible of embodiment in many different forms, there is shown in the drawings and will herein be described in detail, several specific embodiments with the understanding that the present disclosure is to be considered as an exemplification of the principles of the invention and is not intended to limit the invention to the embodiments illustrated.

Figure 4:
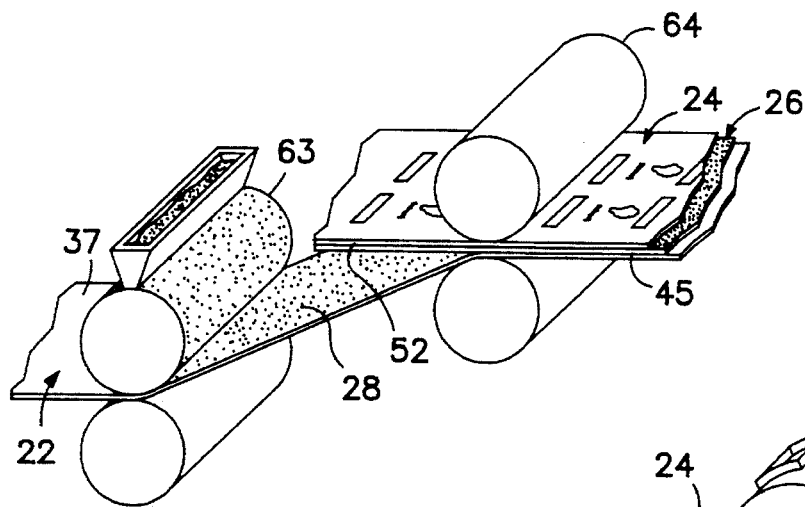
FIG. 4 of the drawings is a top perspective view of the adhesive applicator, showing, in particular, the application of means to the first layer of material, as well as showing attachment of the first layer of material to the laminate material and, in turn, to the second layer of material.
Figure 5:
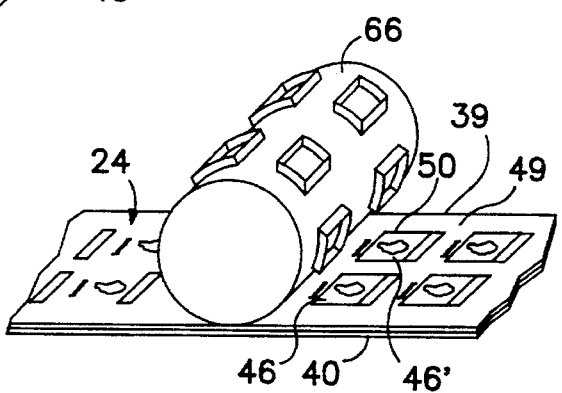
FIG. 5 of the drawings is a top perspective view of the die-cutter showing, in particular, the cutting of the predetermined portions of the second layer of material and, in turn, the detachable card members created thereby.
Figure 6:
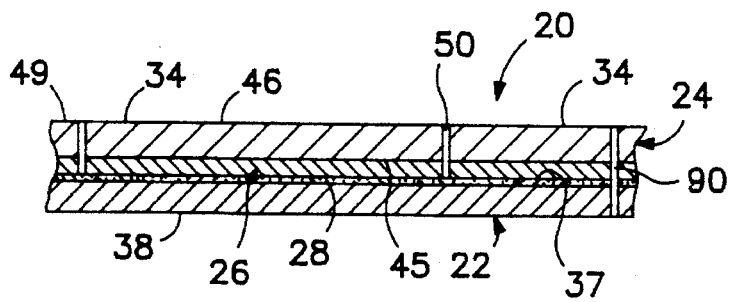
FIG. 6 of the drawings is a cross sectional view of the integrated card and business form assembly of FIG. 5, showing, in particular, the co-planar top and bottom surfaces of the card members with the top and bottom surfaces of the surrounding border region, respectfully, of the surrounding border region.
Figure 7:
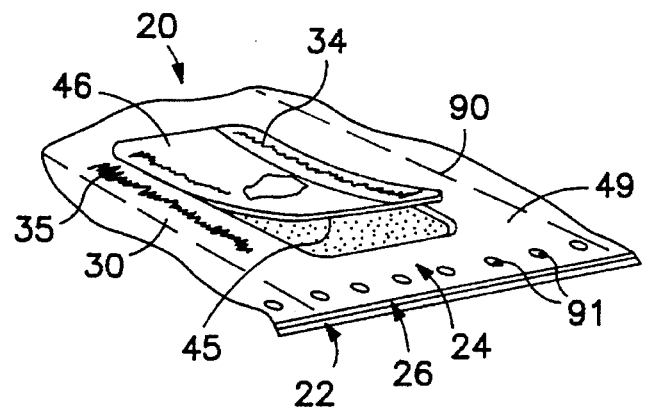
FIG. 7 of the drawings is a partial cut away view of the completely assembled integrated card and business form assembly showing, in particular, the perforated sections across the first and second layers of material, as well as the partial detachment of the card member from the assembly.

Integrated card and business form assembly 20 is shown in FIG. 1, FIG. 6 and FIG. 7 as comprising first layer of material 22, second layer of material 24, laminate means 26, adhesive means 28 (FIG. 4 and FIG. 6), perforation means 30 (FIG. 7) and indicia, such as indicia 34 and 35 (FIG. 7). First layer of material 22 is shown in FIG. 1 and FIG. 6 as including upper surface 37, lower surface 38 and first and second side edges 39 and 40, respectfully, as shown in FIG. 5. Second layer of material 24 (FIG. 1) includes top surface 44, bottom surface 45, card members, such as card member 46, (FIG. 5 through FIG. 7), surrounding border region 49, which surrounds adjacently positioned card members, as shown in FIG. 6 and FIG. 7, and, multi-directional score line 50, (FIG. 6). Multi-directional score line 50 serves to define each of the particular card members and associated surrounding border regions.

Figure 3:
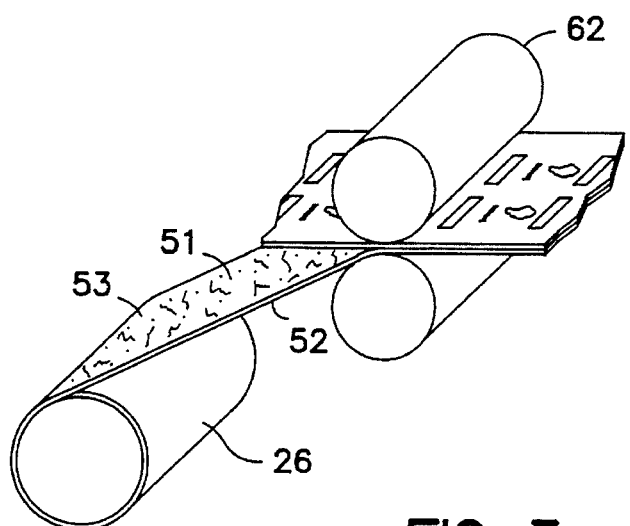
FIG. 3 of the drawings is a top perspective view of the laminating means being operably applied to the bottom surface of the second layer of material.

Laminate means 26 is shown in FIG. 1 and FIG. 3 as comprising first surface 51 and second surface 52. The laminate means includes adhesive 53 (FIG. 3) which is pre-applied onto first surface 51 thereof.

Adhesive means 28 (FIG. 4), which is operably applied to upper surface 37 of first layer of material 22, is preferably a pressure sensitive adhesive, such as an acrylic based permanent adhesive or a removable rubber based adhesive—although other types of conventional adhesives are also contemplated for use. Notably, such pressure sensitive adhesives substantially eliminate the migration thereof to bottom surface 45 (FIG. 6) of card member, such as card member 46 (FIG. 7), upon removal of the card member therefrom. Accordingly, the bottom surface of the card member will not bear any substantial tackiness—as would otherwise occur with the use of various other types of adhesives.

As can be seen in FIG. 6, top surface 34 of each of the card members, such as card member 46, and top surface 34 of surrounding border region 49, are substantially co-planar with each other—as opposed to having a portion of the top surface of the card member positioned above or below the top surface of the surrounding border region. Accordingly, such a co-planar relationship not only serves to provide uniform and consistent positioning of the card members on the assembly—inasmuch as such card members are integrated with the surrounding border region/business form—but it also facilitates increased productivity when assembly 20 is utilized with additional business equipment; due to, among other things, substantial reduction in machine down time which may otherwise occur should the peripheral edges of non co-planar card members partially or completely, raise off the backing material (first layer) during such additional operations.

Figure 2:
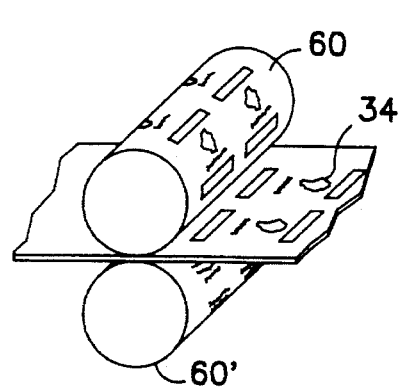
FIG. 2 of the drawings is a top perspective view of the printing rollers of FIG. 1, showing in particular, the application of indicia to the top and bottom surfaces of the second layer of material.

Manufacturing of integrated card and business form assembly 20 on conventional label formation machinery, such as a single label converting press, is shown in a schematic diagram in FIG. 1 as comprising first layer of material 22, second layer of material 24, laminate means 26, printing rollers 60, 60', first and second attachment rollers 62, 64, respectfully, adhesive applicator 63, die-cutter 66 and perforator/holecutter 67. In operation, second layer of material 24, which may comprise an 8 pt tag grade paper stock, is introduced into the label converting press, or the like. As the introduction of the second layer (which will become the card members and surrounding border regions) continues, top and/or bottom surfaces 44 and 45, respectfully, are printed with indicia, such indicia 34 (FIG. 2) by printing rollers 60, 60', (FIG. 1 and FIG. 2). After such printing has occurred, laminate means 26, which comprises a laminate material, is introduced and operably attached to bottom surface 45 of second layer of material 24 at first attachment rollers 62 (FIG. 1 and FIG. 3). Such a laminate material is conventionally available and is typically constructed from polypropylene, polyethylene, polystyrene, or polyester. In addition, an adhesive 53 is generally pre-applied to first surface 51 (FIG. 3) of the laminate material so as to facilitate attachment to bottom surface 45 of second layer of material 24.

After the laminate material has been attached to the second layer of material, first layer of material 22 is fed into the label converting press. At this time, upper surface 37 of the first layer of material is at least partially coated with adhesive means 28 (FIG. 4) via adhesive applicator 63. Upper surface 37 of first layer of material 22 is then releasably attached to second surface 52 of laminate means 26, and, in turn, to bottom surface 45 of second layer of material 24 at second attachment rollers 64 (FIG. 1 and FIG. 4).

Although a laminate material is shown as being used, it is also contemplated that integrated card and business form assembly 20 be constructed without the use of the laminate material. However, the use of the laminate material may be preferred to increase overall rigidity to the integrated card and business form assembly, as well as for facilitating removal of the card member from the adhesive means 28 without any substantial migration of the adhesive means to bottom surface 45 of the respective card member.

After first layer of material 22 has been releasably attached to the laminate material and, in turn, to the second layer of material, the partially complete integrated card and business form assembly continues toward and past die-cutter 66 (FIG. 1 and FIG. 5). As can be seen in FIG. 5 and FIG. 6, die-cutter 66 imparts a multi-directional score line 50 through the entire depth of second layer of material 24. (FIG. 6) without cutting through the entire depth of first layer of material 22. This die-cutting procedure results in the formation of, among other things, the individual card members, such as card members 46, 46' (FIG. 5) and the associated surrounding border region 49. In addition, the surrounding border region and card members each have top surfaces which are in substantially co-planar relationship with each other. Although such multi-directional score lines are shown as a continuous score line, it is also contemplated that such a score line be perforated.

After the die-cutting operation has been performed, the partially completed assembly continues on to the perforating and hole punching rollers 67 (FIG. 1). At this point, perforation lines 90 (FIG. 6 and FIG. 7) are made across a portion of both the first and second layers of material 22, 24, respectfully, and holes 91 (FIG. 7) are punched adjacent the first and second side edges of the first and second layers of material. The perforations serve to facilitate future separation and folding of predetermined portions of the attached first and second layers of material from one another. In addition, the holes serve to facilitate use of integrated card and business form assembly 20 on conventional business equipment which may require such holes for transmission via a tractor feed mechanism.

An enhanced embodiment of the method described above is shown in schematic form in FIG. 8. Accordingly, like reference numerals will be applied where applicable. In this embodiment, an adhesive deadner 70 (FIG. 9) is operably applied to bottom surface 45 of second layer of material 24, prior to attachment of laminate means 26 (FIG. 8), and, in turn, prior to attachment of first layer of material 22 to the second layer of material. It is also contemplated that such adhesive deadner comprise any conventional material, such as silicone, which will hinder, inhibit or neutralize such adhesion. Accordingly, adhesive deadner 70 will preclude attachment of laminate means 26, and, in turn, the first layer of material 22 to those portions of bottom surface 45 of second layer of material 24 which have been substantially covered with adhesive deadner.

Figure 8:
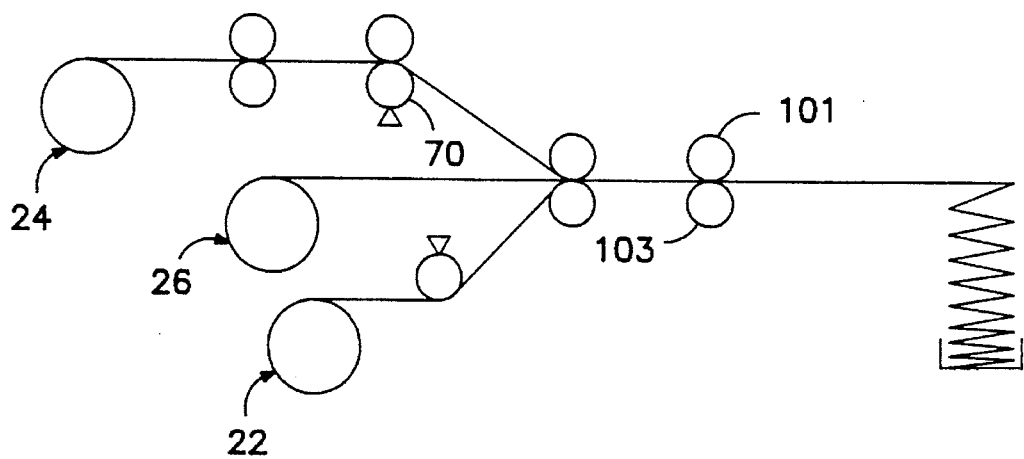
FIG. 8 of the drawings is a schematic diagram of another preferred embodiment of the method for manufacturing an integrated card and business form assembly.
Figure 9:
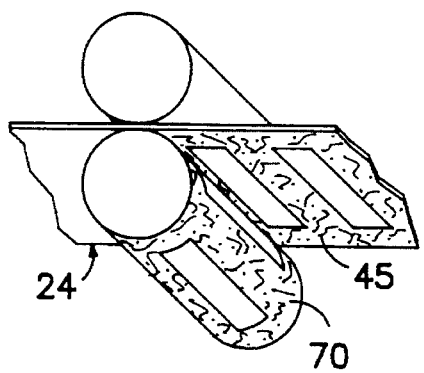
FIG. 9 of the drawings is a bottom perspective view of the die-cutter of FIG. 8, showing, in partifuclar, adhesive deadner being applied to predetermined portions of the bottom surface of the second layer of material.
Figure 10:
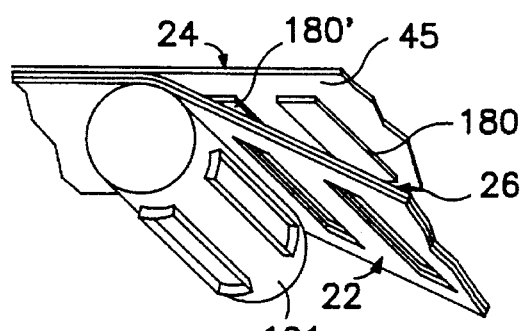
FIG. 10 of the drawings is a bottom perspective view of the die-cutter of FIG. 8, showing, in particular, the die-cutting around the areas where adhesive deadner has not been applied, as well as showing the removal of the remainder of the first layer of material which has been precluded from adherence to the bottom surface of the second layer of material by the adhesive deadner.

After adhesive deadner 70 has been operably applied to bottom surface 45 of second layer of material 24 and after laminate means 26 and, in turn, first layer of material 22 have been operably attached to those portions of the second layer of material which have not been coated with the adhesive deadner, the integrated card and business form assembly will then continue toward and past die-cutter 101 (FIG. 8 and in FIG. 10). At this point, die-cutter cuts through the entire depth of first layer of material 22 (FIG. 10)—at the location adjacent to where the adhesive deadner was not applied. Accordingly, those portions of the laminate material 26 and adjacently positioned portions of the first layer of material 22 which were precluded from attachment to bottom surface 45 of second layer of material 24 (as a result of the adhesive deadner) will be removed through take-up reel 103 (FIG. 1).

Figure 11:
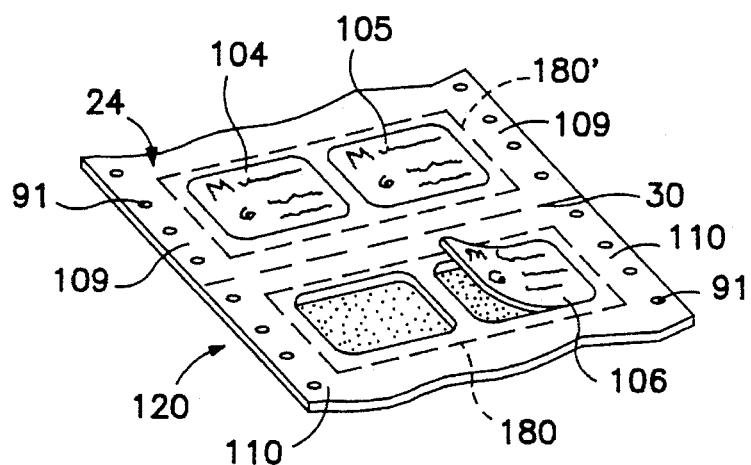
FIG. 11 of the drawings is a top perspective view of a completely manufactured intergrated card and business form assembly as manufactured in accordance with the method shown in FIG. 8, showing, in particular, the remaining patches of the first layer of material, as shown in dashed lines, as well as the co-planar relationship of the top and bottom surfaces of the card members with the top and bottom surfaces, respectfully, of the surrounding border region, and the adhesive which remains on the patch (first layer of material) after removal of the upper surface of the card member.

A portion of the completely manufactured integrated card and business form assembly 120 is shown in FIG. 11 as comprising second layer of material 24, perforation means 30 (which separate predetermined portions 109, 110), punched holes 91 along the first and second side edges of the assembly card members 104, 105, and 106 and, the remaining portions of the first layer of material 22 and laminate means 26. These remaining portions, which resemble "patches", 180, 180', not only serve to reduce the overall weight of the assembly (so as to reduce shipping costs), but, inasmuch as such patches are located away from the perforation lines 30, folding of the assembly along the perforations will be facilitated.

Figure 12:
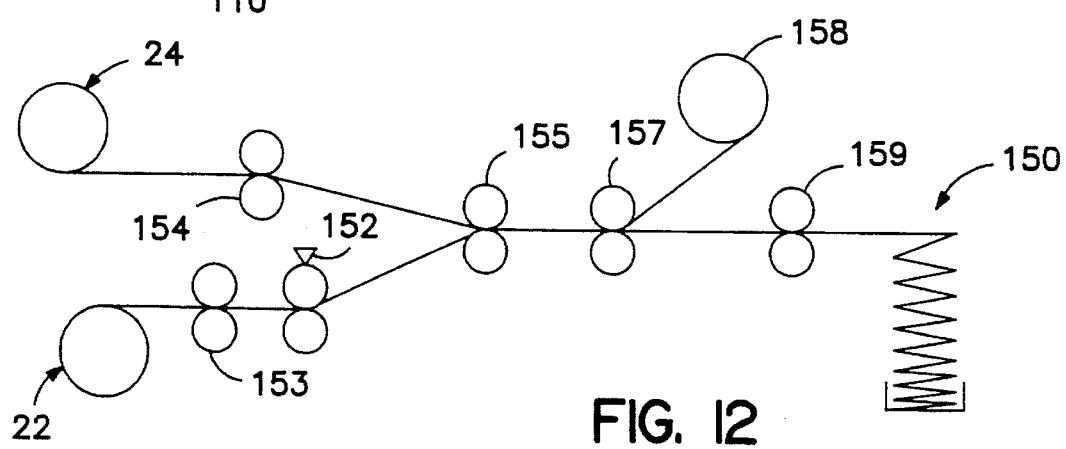
FIG. 12 of the drawings is a schematic diagram of yet another preferred embodiment of the method for manufacturing an integrated card and business form assembly.
Figure 13:
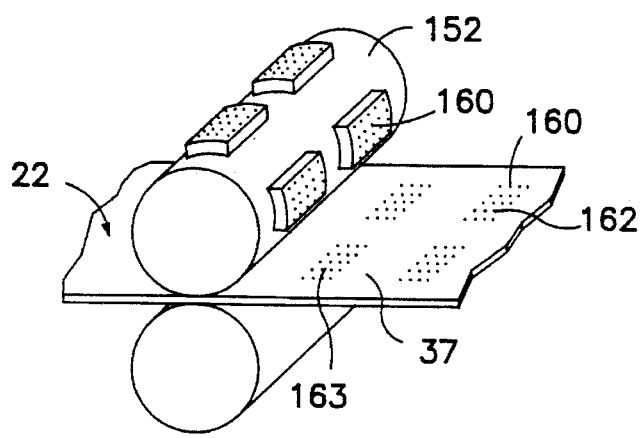
FIG. 13 of the drawings is a top perspective view of the adhesive means applicator of FIG. 12 showing, in particular, the application of adhesive means to predetermined regions on the upper surface of the first layer of material.
Figure 18:
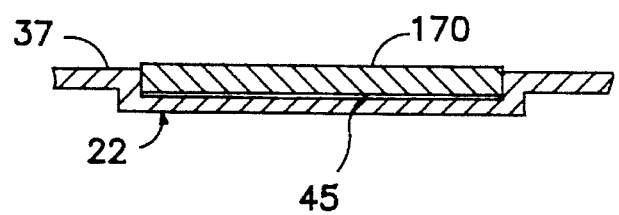
FIG. 18 of the drawings is a cross-sectional view of the integrated card and business form assembly, after embossing, showing, in particular, the operable positioning of the bottom surface of the card member substantially below the upper surface of the first layer of material.

Another method of manufacturing an alternative embodiment of integrated card and business form assembly 150 (FIG. 18) is shown in FIG. 12 as comprising first layer of material 22, second layer of material 24, adhesive applicator 152, first and second printing rollers 153 and 154, respectively, attachment rollers 155, die-cutter 157, take-up real 158, and depressing real 159. During the manufacturing procedure, first layer of material 22 is fed into a label converting press and adhesive means, such as adhesive means 160 (FIG. 13), is applied to predetermined regions, such as predetermined regions 162 and 163 (FIG. 13) on upper surface 37 of first layer or material 22 by adhesive applicator 152 (FIG. 12 and FIG. 13). If desired, top and/or bottom surfaces 44 and 45, respectively, of first layer of material 22 can be imprinted with indicia by first printing rollers 153 (FIG. 12).

Figure 14:
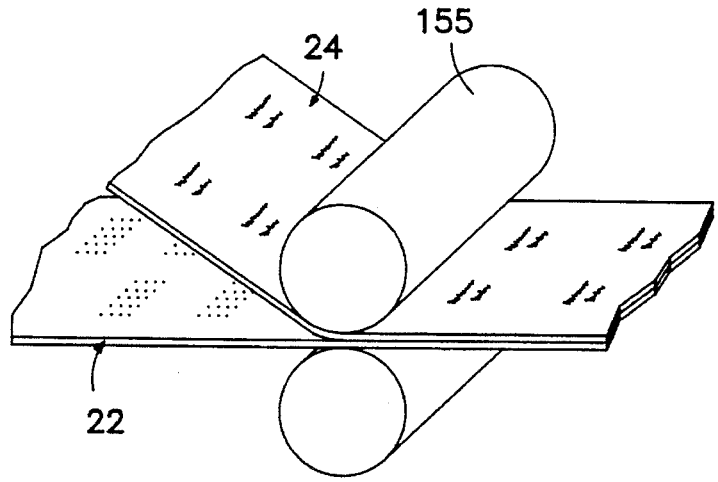
FIG. 14 of the drawings is a top perspective view of the attachment rollers of FIG. 12, showing, in particular, attachment of the second layer of material to the first layer of material after indicia has been applied to the second layer of material.
Figure 15:
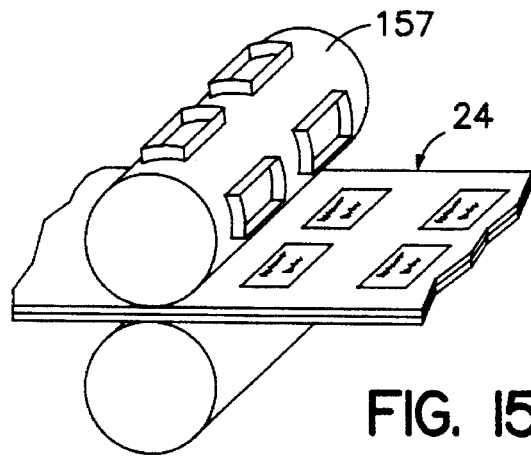
FIG. 15 of the drawings is a top perspective view of the die-cutter of FIG. 12, showing, in particular, the die-cutting operation, as well as showing the die-cut regions completely through the second layer of material so as to form detachable card members having their top surfaces substantially co-planar with the top surface of the surrounding border region.
Figure 16:
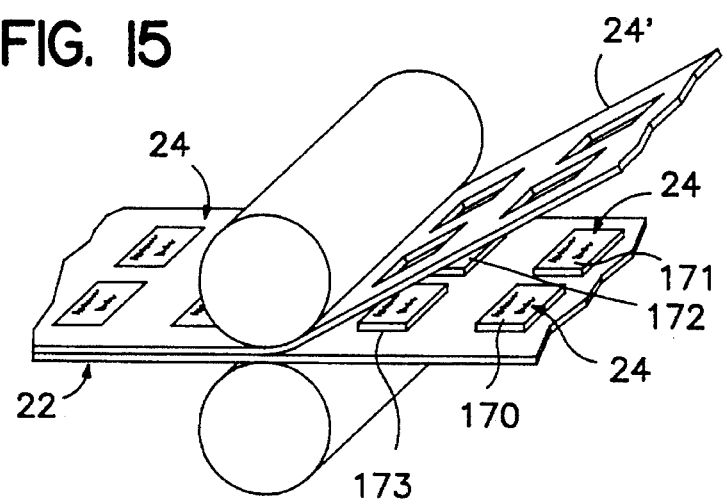
FIG. 16 of the drawings is a top perspective view of the removal of the surrounding border region after the die-cutting operation.

Either prior to, or at the same time as the printing of indicia on the first layer of material, second layer of material 24 is introduced into the label converting press and indicia is applied thereto by second printing roller 154 (FIG. 12). After such printing has occurred, and after predetermined adhesive regions 162, 163 (FIG. 13) have been applied to first layer of material 22, the first and second layers of material are attached to each other (at the predetermined adhesive regions only), by attachment rollers 155 (FIG. 12 and FIG. 14). The attached first and second layers of material then continue toward and past die-cutter 157 (FIG. 12 and FIG. 15), wherein the die-cutter cuts through the entire depth of second layer of material 24 so that the only remaining portions of the second layer of material are those portions which are directly over the predetermined adhesive regions (as shown in FIG. 16.). These remaining portions now become detachable card members, such as card members 170 through 173. Furthermore, that portion 24' of second layer of material 24 which is not adhesively attached to first layer of material 22 is removed by take-up real 158 (FIG. 12) and eventually discarded as waste.

Figure 17:
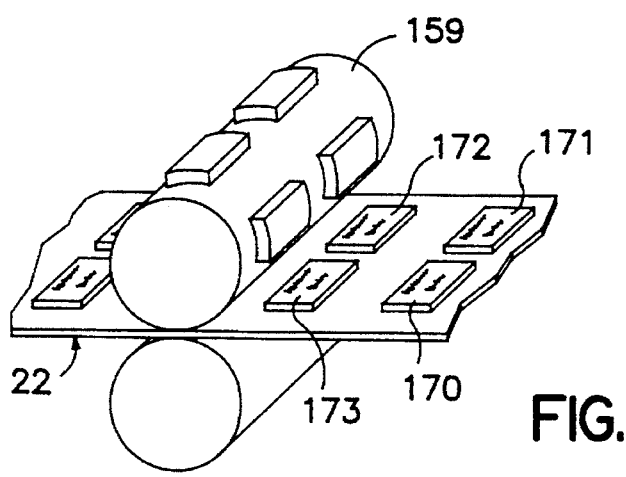
FIG. 17 of the drawings is a top perspective view of the depressing rollers of FIG. 12 showing, in particular, the simultaneous depressing/embossing of the card members and the underlying portions of the first layer of material thereunder.

After the waste product is removed by take-up real 158, integrated card and business form assembly 150, which now consists of first layer 22 and the individual detachable card members, such as card members 170 through 173 (FIG. 16 and FIG. 17), pass through depressing rollers 159 (FIG. 12 and FIG. 17). These depressing rollers simultaneously depress, or "emboss," each of the card members and the underlying portions of first layer of material 22—so that the bottom surface 45 (FIG. 18) of each of the card members, such as card member 170, are operably positioned below upper surface 37 (FIG. 18) of contiguously positioned portions of first layer of material 22. Although the previously described method of manufacturing and associated integrated card and business form assembly has been shown and described as including simultaneously depressed card members and underlying portions of the first layer of material, it is also contemplated that such a method and associated assembly be manufactured without such depressing, if desired.

The foregoing description and drawings merely explain and illustrate the invention and the invention is not limited thereto except in so far as the appended claims are so limited as those skilled in the art who have the disclosure before them will be able to make modifications and variations therein without the departing from the scope of the invention.

What is claimed is:

1. An integrated card and business form assembly capable of being fabricated on conventional label formation equipment, or the like, said integrated card and business form assembly comprising:

a first layer of material having an upper surface and a lower surface opposite said upper surface;

a second layer of material comprising at least one card member together with a surrounding border region, said second layer of material having a top surface and a bottom surface, and, in turn, said at least one card member and said surrounding border region each having a top and bottom surface, wherein said top surface of said at least one card member is substantially co-planar with said top surface of said surrounding border region and said bottom surface of said at least one card member is substantially co-planar with said bottom surface of said surrounding border region;

adhesive means operably applied to at least a portion of at least said upper surface of said first layer of material for releasably securing said at least one card member to said upper surface of said first layer of material;

said at least one card member including means for releasable detachment from said upper surface of said first layer of material and from the surrounding border region without substantial portions of said adhesive means migrating from the top surface of said first layer of material to said bottom surface of said at least one card member; thereby precluding said bottom surface of said at least one card member from bearing tackiness along said bottom surface after detachment from said upper surface of said first layer of material.

2. The invention according to claim 1 wherein said means for releasable detachment of said at least one card member from said first layer of material comprises laminate means operably applied to said bottom surface of said at least one card member of said second layer of material for increasing the rigidity of each of said at least one card member as well as for reducing adhesion of said bottom surface of said at least one card member to said upper surface of said first layer of material through said adhesive means to, in turn, facilitate removal of said at least one card member from said upper surface of said first layer of material without said substantial migration of said adhesive means.

3. The invention according to claim 1 wherein said second layer of material comprises a single sheet of material;

at least a portion of said single sheet of material having at least one multi-directional score line, wherein said at least one score line substaintially defines the entire periphery of said at least one card member for frangible detachment of said at least one card member from said surrounding border region.

4. The invention according to claim 1 wherein said first and second layers of material each include substantially aligned corresponding first and second side edges respectively, and a plurality of holes operably positioned adjacent each of said corresponding first and second side edges, said plurality of holes extending through said first and second layers of material.

5. The invention according to claim 1 wherein said integrated card and business form assembly further comprises a plurality of said intergrated card and business form assemblies in the form of a continous web, said web including perforation means operably formed across said first and second layers of material at designated intervals for enabling individual portions of said attached first and second layers of material to be separated from remaining portions of said attached first and second layers of material so as to form individual ones of said integrated card and business form assemblies.

6. The invention according to claim 1 wherein said integrated card and business form assembly further comprises indicia operably applied onto at least one of said top and bottom surfaces of said second layer of material.

7. The invention according to claim 1 wherein said integrated card and business form assembly further comprises indicia operably applied onto both of said top and bottom surfaces of said second layer of material.

8. The invention according to claim 1 wherein said adhesive means comprises a pressure sensitive adhesive.

9. A method of manufacturing an integrated card and business form on one or more conventional label formation machines, the method comprising the steps of:

feeding a first layer of material into the one or more label formation machines, the first layer of material having an upper surface and a lower surface opposite the upper surface;

introducing a second layer of material into the one or more label formation machines, the second layer of material having a top surface and a bottom surface opposite the top surface;

applying adhesive to the upper surface of the first layer of material;

releasably attaching the upper surface of the first layer of material to at least a portion of the bottom surface of the second layer of material through the adhesive so applied; and cutting a continuous peripheral portion of the second layer of material through its entire depth without cutting through the entire depth of the first layer of material, said step of cutting through the entire depth of said continuous peripheral portion of the second layer of material creating at least one detachable card member having a top surface and a bottom surface opposite the top surface, and a surrounding border region having a top surface and a bottom surface opposite the top surface, operably located about the at least one card member, wherein the top surface of the at least one card member is substantially co-planar with the top surface of the surrounding border region and the bottom surface of the at least one card member is substantially co-planar with the bottom surface of the surrounding border region, each of the at least one card member being releasably detachable from said upper surface of said first layer of material and said surrounding border region without substantial portions of the adhesive migrating from the top surface of the first layer of material to the bottom surface of the at least one card member; thereby precluding the bottom surface of the at least one card member from bearing tackiness along the bottom surface.

10. The invention according to claim 9 wherein the method of manufacturing an integrated card and business form on one or more label formation machines further includes the step of printing indicia on at least a portion of at least one of the top and bottom surfaces of the second layer of material after introduction of the second layer of material into the one or more label formation machines.

11. The invention according to claim 10 wherein the step of printing indicia on at least a portion of at least one of said top and bottom surfaces of said second layer of material includes the step of printing predetermined indicia onto the top surface of the surrounding border region.

12. The invention according to claim 10 wherein the step of printing indicia on at least a portion of at least one of said top and bottom surfaces of said second layer of material comprises the step of printing predetermined indicia onto a portion of the top and bottom surfaces of said second layer of material that are ultimately created by said step of cutting into said at least one detachable card member.

13. The invention according to claim 9 wherein the method of manufacturing an integrated card and business form on one or more label formation machines further includes the step of applying an adhesive deadner to at least a portion of the bottom surface of the second layer of material, the adhesive deadner serving to preclude adhesion of adjacently positioned portions of the top surface of the first layer of material to the bottom surface of the second layer of material at siad portions to which said adhesive deadner has been applied.

14. The invention according to claim 13 wherein the method of manufacturing an integrated card and business form on one or more label formation machines further includes the step of cutting and removing adjacently positioned portions of the top surface of the first layer of material which have been substantially precluded from adhesion to the bottom surface of the second layer of material by the adhesive deadner.

15. The invention according to claim 9 wherein the method of manufacturing an integrated card and business form on one or more label formation machines further includes the step of applying a laminate material to at least one of the top and bottom surfaces of the second layer of material.

16. The invention according to claim 15 wherein the laminate material is applied to the top surface of the first layer of material:

the method of manufacturing an integrated card and business form on one or more label formation machines further includes the step of applying an adhesive deadner to at least a portion of the bottom surface of the second layer of material;

the adhesive deadner serving to preclude adhesion of adjacently positioned portions of the laminate material and, in turn, adjacently positioned portions of the top surface of the first layer of material, to the bottom surface of the second layer of material.

17. The invention according to claim 9 wherein the method of manufacturing an integrated card and business form on one or more label formation machines further includes the step of perforating across continiuous peripheral portions of the first and second layers of material after the step of attaching the first and second layers of material to each other so as to facilitate future separation and folding of predetermined portions of the attached first and second layers of material from one another.

18. The invention according to claim 9 wherein each of the first and second layers of material includes substantially aligned corresponding first and second side edges:

the method of manufacturing an integrated card and business form on one or more label converting presses further including the step of punching holes adjacent the first and second side edges of the attached first and second layers of material so as to facilitate use of the integrated card and business form created thereby on conventional business equipment which requires such holes for transmission via tractor feed mechanisms.

19. The invention according to claim 9 wherein the step of applying adhesive to at least a portion of the upper surface of the first layer of material comprises applying adhesive only to that portion of the upper surface which will become adjacently positioned to each of the at least one detachable card members.

20. The invention according to claim 19 wherein the method of manufacturing an integrated card and business form on one or more label formation machines further comprises the step of removing the cut surrounding border region away from the at least one detachable card member and, in turn, away from the first layer of material.

21. The invention according to claim 9 wherein the method of manufacturing an integrated card and business form on one or more label formation machines comprises the step of utilizing a single label formation mahcines for such manufacturing.

22. A method of manufacturing an integrated card and business form on one or more conventional label formation machines, the method comprising the steps of:

feeding a first layer of material into the one or more label formation machines, the first layer of material having an upper surface and a lower surface opposite the upper surface;

introducing a second layer of material into the one or more label formation machines, the second layer of material having a top surface and a bottom surface opposite the top surface;

applying adhesive to predetermined regions of the upper surface of the first layer of material;

releasably attaching at least a portion of the upper surface of the first layer of material to at least a portion of the bottom surface of the second layer of material through the adhesive so applied;

cutting a continuous peripheral portion of the second layer of material through its entire depth without cutting through the entire depth of the first layer of material, said step of the cutting through the entire depth of said continuous peripheral portion of the second layer of material creating at least one detachable card member having a top surface and a bottom surface opposite the top surface, and a surrounding border region having a top surface and a bottom surface opposite the top surface, operably located about the at least one card member, wherein the top surface of the at least one card member is substantially co-planar with the top surface of the surrounding border region and the bottom surface of the at least one card member is substantially co-planar with the bottom surface of the surrounding border region, each of the at least one card member having its respective bottom surface positioned adjacent to and, in turn, in contact with, a corresponding predetermined region of adhesive;

removing the cut surrounding border region of the second layer of material away from the at least one detachable card member and, in turn, away from the first layer of material; and simultaneously depressing the at least one card member and adjacently positioned portions of the first layer of material so that the bottom surface of each of the at least one card member is operably positioned below the upper surface of contiguous positioned portions of the first layer of material, each of the at least one card member being releasably detachable from the predetermined, and depressed regions, of the first layer of material substantially without substantial portions of the adhesive migrating from the predetermined regions of adhesive on the top surface of the first layer of material to the bottom surface of the at least one card member; thereby precluding the bottom surface of the at least one card member from bearing tackiness along the bottom surface.

\* \* \* \* \*